(12) United States Patent
Perrucci

(10) Patent No.: US 6,412,275 B1
(45) Date of Patent: Jul. 2, 2002

(54) SOLID PROPELLANT GAS GENERATOR IMPULSE MANAGEMENT SCHEME FOR HIGH MASS FLOW TURN-DOWN RATIO

(75) Inventor: Andrew Perrucci, San Jose, CA (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/658,138

(22) Filed: Sep. 8, 2000

(51) Int. Cl.[7] .................................................. F02K 9/28
(52) U.S. Cl. ............................ 60/204; 60/234; 60/254
(58) Field of Search ........................... 60/204, 234, 254

(56) References Cited

U.S. PATENT DOCUMENTS 3,806,064 A * 4/1974 Parilla ........................ 244/3.22
3,940,067 A * 2/1976 Cherry ..................... 239/265.11
4,856,276 A * 8/1989 Solberg ........................ 60/250

* cited by examiner

Primary Examiner—Charles G. Freay
Assistant Examiner—Ehud Gartenberg
(74) Attorney, Agent, or Firm—Bachman & LaPointe, P.C.

(57) ABSTRACT

A solid divert and attitude control system for use on a kill vehicle or missile that includes a solid propellant gas generator, a control valve for modulating the effective exit area of the solid propellant gas generator, and a controller for calculating the integral of the burn rate of the solid propellant and for controlling operation of the control valve in response to the calculation of the integral of the burn rate of the solid propellant. The solid propellant gas generator has a solid propellant with a non-constant burn area and a grain profile which includes a first boost phase grain, an intermediate sustain phase grain, and a second boost phase. The controller controls operation of the control valve during a coast phase of the mission so that the second boost phase grain does not ignite until the beginning of the terminal phase of the mission.

12 Claims, 2 Drawing Sheets

SOLID PROPELLANT GAS GENERATOR IMPULSE MANAGEMENT SCHEME FOR HIGH MASS FLOW TURN-DOWN RATIO

BACKGROUND OF THE INVENTION

The present invention relates to a solid propellant gas generator impulse management scheme for high mass flow turn-down ratio. More particularly, the present invention is directed to a solid divert and attitude control system that has particular utility on kinetic hit-to-kill weapons and other types of missiles.

Divert and attitude control systems (DACS) are required for maneuvering kinetic hit-to-kill weapons. Kinetic kill vehicles (kv) or missiles are used to destroy missiles or other airborne or spaceborne objects such as satellites. Impulse flexibility (energy management) is a critical performance parameter for these systems because greater flexibility means a more capable vehicle. Liquid propulsion systems currently provide the most flexibility because they possess inherent impulse management through on-off operation; that is, propellant is only used when needed. However, the current generation of liquid systems is toxic and presents safety and environmental hazards. Hybrid propulsion systems, like liquid systems, are flexible in energy management and can be made non-toxic for improved safety; however, density-impulse is greatly reduced. Solid propulsion systems on the other hand have the highest density-impulse and can be made to meet all safety and insensitive munitions requirements, but do not have the desired energy management flexibility.

Various methods have been attempted to provide increased energy management capability to solid divert and attitude control systems such as: pulsed operation from independently ignitable grains, dP/dT extinguishments and re-ignition with multiple igniters, and pressure control through exit area modulation either proportionally or by pulse width modulation (PWM). Each of these methods has limitations in operation (for instance, limited impulse flexibility and low turn down ratio) and other undesirable attributes (for example, increased components, complexity, cost, and weight).

The management scheme and system of the present invention overcomes these drawbacks.

SUMMARY OF THE INVENTION

It is an object of the present invention to provide a solid divert and attitude control system that can achieve a turn-down ratio in excess of thirty to one.

It is a further object of the present invention to provide a solid divert and attitude control system as above that has a thrust response (rate of change of thrust) which exceeds that of a hypergolic system.

The foregoing objects are attained by the solid divert and attitude control system of the present invention.

In accordance with the present invention, the solid divert and attitude control system comprises a solid propellant gas generator having a solid propellant grain with a profile for generating different thrust levels during different portions of a flight, a control valve means for modulating the effective exit area of the solid propellant gas generator, and a controller for calculating the propellant burn rate and for controlling the operation of the control valve means to alter the pressure being generated by the solid propellant gas generator during a coast phase of the vehicle's flight. In a preferred embodiment of the present invention, the solid propellant generator grain profile includes a first high thrust or boost phase grain, an intermediate low thrust or sustain phase grain, and a second high thrust or boost phase grain along the web.

The solid divert and attitude control system of the present invention has a number of advantages including a turndown ratio in excess of 30:1. Further, the system enables a wide variety of mission timelines to be accommodated due to the operation of the controller. Still further, the system of the present invention has a moderate thrust midcourse correction capability of 40% to 50% of boost phase thrust depending on the turndown ratio and enables a solid propulsion system to have nearly the same impulse flexibility as a liquid propulsion system.

Other details of the solid divert and attitude control system of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Upon kv separation from the launcher, a first boost (or high thrust) phase is initiated. After this first boost phase is completed, the kv enters a coast phase. Just prior to impact, the kv enters a second boost phase. In order for the kv to accomplish its mission, this second boost phase must occur at a precise point in a mission. If it occurs too soon, the kv may run out of fuel prior to impact and not complete its mission. If the second boost phase occurs too late, the kv may miss its target.

Figure 1:
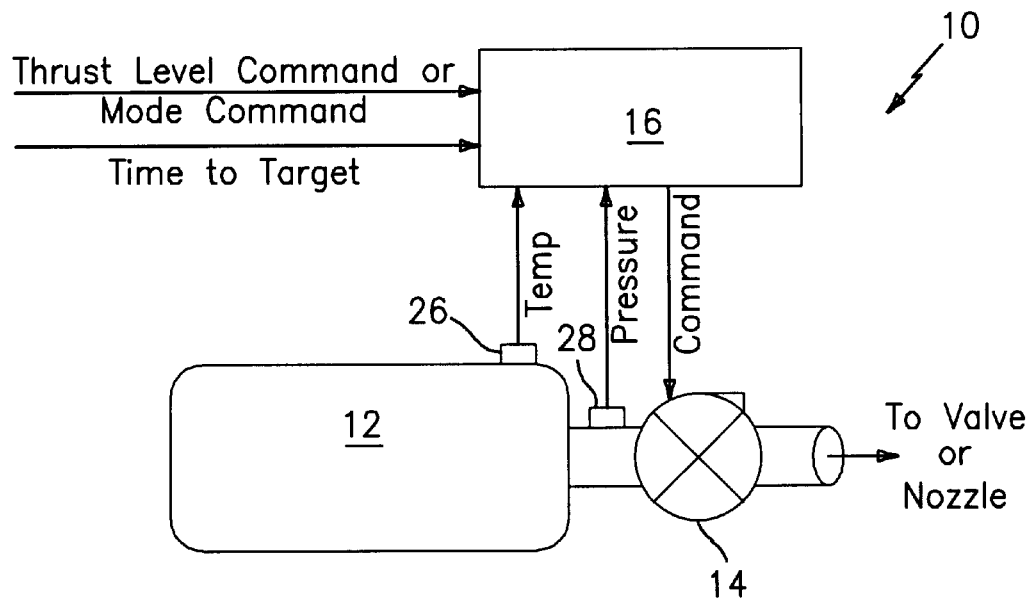
FIG. 1 is a schematic representation of a solid divert and attitude control system in accordance with the present invention.

Referring now to the drawings, FIG. 1 illustrates a solid divert and attitude control system 10 in accordance with the present invention. The system 10 may be used in a kv and other types of missiles and missile applications. The system 10 broadly includes a solid propellant gas generator 12 with a solid propellant having a grain profile for generating different thrust levels during different portions of a flight, a control valve 14 for modulating the effective exit area of the solid propellant gas generator, and a controller 16 for controlling the operation of the control valve 14 to affect generator pressure control and to insure that the second boost phase occurs when the terminal phase of the k's or missile's flight begins.

The control valve 14 may comprise any suitable type of control valve known in the art which can withstand the erosion which can be caused by hot gas generators. The controller 16 may comprise any suitable controller known in the art.

Figure 2:
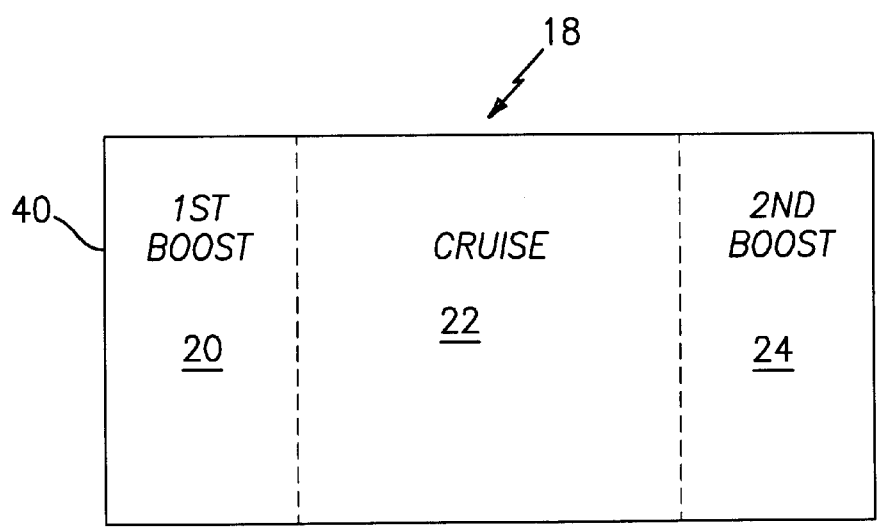
FIG. 2 is a schematic representation of a grain profile with a constant burn area.

The solid propellant gas generator contains a solid propellant grain 18 which has a profile across the web (the distance from the initial burn point or surface 40 to the final burn point) that has a first boost phase grain 20, an intermediate sustain phase grain 22 and a second boost phase grain 24. One such system, having a constant burn area, which could be used in the system of the present invention, is shown in FIG. 2. Typically, in this type of solid propellant system, the operating pressure range is from about 100 to about 2500 psi. If one were to use this type of solid propellant grain profile and control just valve area, one could obtain, depending on the type of propellant selected, a maximum turn down ratio (the ratio of the highest thrust to the lowest thrust) of 14:1.

Figure 3:
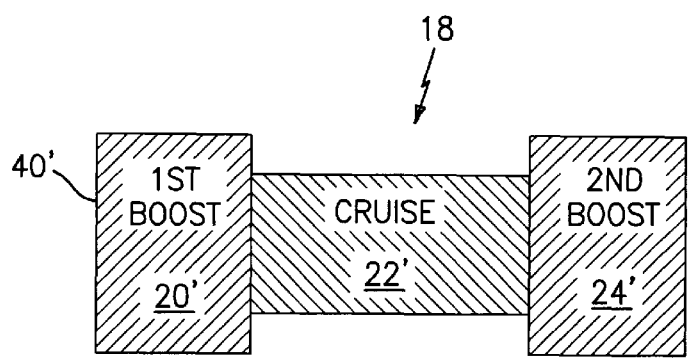
FIG. 3 is a schematic representation of a grain profile with a burn area in accordance with a preferred embodiment of the present invention.

A preferred embodiment of a solid propellant grain 18 to be used in the system of the present invention is shown in FIG. 3. As before, the solid propellant grain 18' has a profile which includes, from an initial burning surface 40', a first boost phase grain 20', an intermediate sustain phase grain 22', and a second, final boost phase grain 24' across the web. As before, the solid propellant has an operating pressure range from about 100 to about 2500 psi. The solid propellant 18' in FIG. 3 differs from that in FIG. 2 in that it has a non-constant burn area where the total area of each of the first and second boost phase grains 20' and 24' is greater than the total area of the intermediate sustain phase grain 22'. In a preferred embodiment, the total area of each of the first and second boost phase grains 20' and 24' is at least twice, and most preferably three and one-half times, the area of the intermediate sustain phase grain 22'. Without a valve controlling exit area, it has been found that such a solid propellant grain profile results in a maximum turndown ratio of approximately 24:1 .

It has been found however that if one wants to incorporate the solid propellant grain configuration of FIG. 3 into the control system of the present invention and achieve turndown ratios of greater than 30:1, one needs to manage, through valve area changes, the impulse created by the solid propellant generator during the sustain portion of the flight of the missile or kv.

In accordance with the present invention, the controller 16 is used to control generator pressure and compute the propellant burn rate integral. The controller 16 may comprise any suitable processor or controller known in the art for carrying out these functions. Further, if needed, the controller 16 may be programmed to carry out the aforesaid functions using any suitable programming language known in the art.

In order to provide the controller 16 with information that it needs to calculate the propellant burn rate, sensors 26 and 28 are provided. Sensor 26 measures the mean bulk temperature of the solid propellant in the generator 12 and transmits the measured temperature to the controller 16. Sensor 28 measures the real-time pressure of the gas being generated by the generator 12 and transmits the measured pressure to the controller 16. Sensors 26 and 28 may comprise any suitable sensors known in the art.

As shown in FIG. 1, the controller 16 also receives real-time information about the time to target and the thrust level command or mode command from an on-board guidance computer (not shown). As used herein, the thrust level command means a quantification of the thrust to be provided, and the mode command means a command for high or low level thrust.

The controller 16 uses this information to make generator pressure changes for lower thrust mid-course corrections during the coast phase of the flight. The corrections are made by reducing the throat area of the generator using the control valve 14, thereby increasing burn rate and hence thrust. The available thrust is lower, approximately 40 to 50% of maximum (boost phase) divert, because the burn area of the sustain phase grain is lower. Using the system of the present invention, by varying the valve area, a 10 lbf sustain could be turned up to 150 lbf for mid course corrections.

Figure 4:
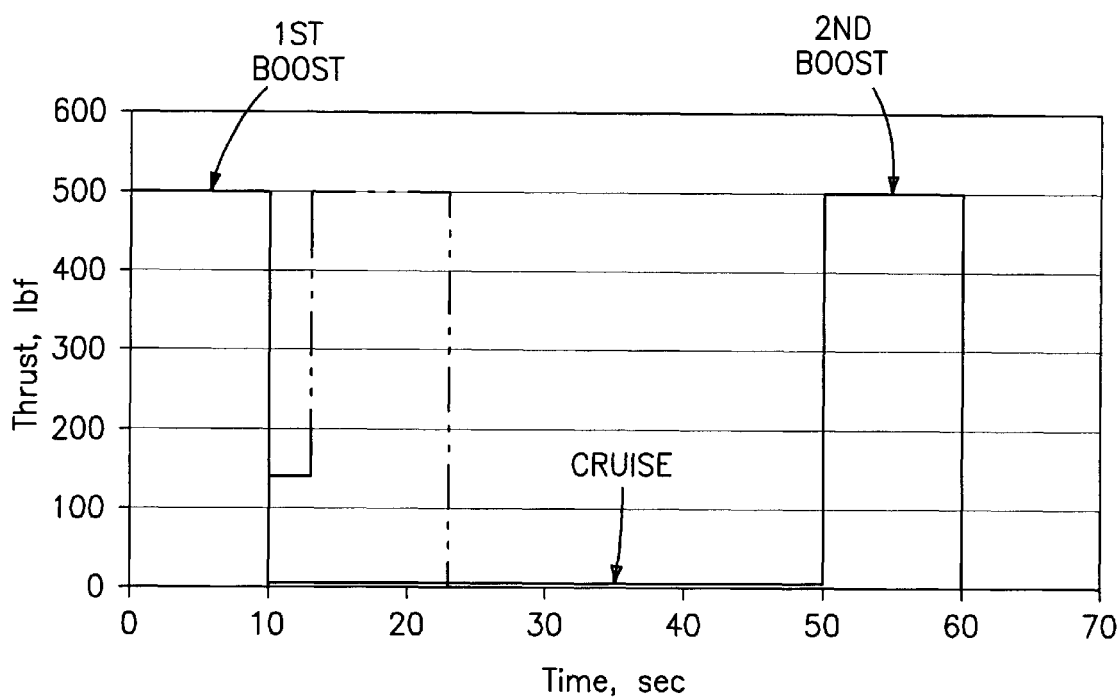
FIG. 4 is a graph illustrating an impulse management profile using the solid divert and attitude control system of the present invention.

For the vehicle to successfully complete its mission, the final burn area change, the initiation of the second boost phase, must occur at a specific length of time prior to intercept. The controller 16 calculates that specific point in time by knowing the second boost phase grain burn time and the time to target. By calculating the propellant burn rate integral, the controller is able to compute the amount of sustain phase grain remaining. During the coast phase of the flight, the sustain pressure level is modified by controller 16 through control of the valve 14. By controlling the valve 14 in this way, the controller 16 insures that the final boost phase grain is exposed at the proper point in time when the terminal phase of the flight must begin. FIG. 4 shows a notional impulse management example. In this figure, the solid line shows the maximum time between boost phases and the maximum turn down ratio, while the broken line illustrates a minimum time between boosts and a much higher level of sustain thrust.

If the propellant burn rate integral calculation is initiated at the transition to the sustain phase, improved accuracy can be obtained.

As previously mentioned, the system of the present invention allows the kv or missile to accommodate a wide range of mission timelines. The system also provides a moderate thrust (40 to 50% of maximum thrust) midcourse correction capability. Further, by varying the valve area, a 10 lbf sustain thrust could be turned up to 150 lbf for mid course corrections.

The system of the present invention eliminates a major drawback of solid divert and attitude control systems and enables a solid propellant gas generator to have nearly the same impulse flexibility as a liquid propulsion system. Further, the system has the ability to rubber band impulse profile to meet variable mission times through burn rate integral calculation and time to target information. Still further, the system of the present invention avoids pressure control problems (sensitivity) associated with high exponent propellants and reduces the required valve throttle range to less than 3:1.

It is apparent that there has been provided in accordance with the present invention a solid propellant gas generator impulse management scheme for high mass flow turn-down ratio which fully satisfies the means, objects, and advantages set forth hereinbefore. While the present invention has been described in the context of specific embodiments thereof, other alternatives, variations, and modifications will become apparent to those skilled in the art after reading the foregoing description. Therefore, it is intended to embrace all such alternatives, variations, and modifications that fall within the broad scope of the appended claims.

What is claimed is:

1. A solid divert and attitude control system for a vehicle comprising:

a solid propellant gas generator having a solid propellant grain with a profile for generating different thrust levels;

a control valve for modulating the effective exit area of the solid propellant gas generator; and a controller for calculating the integral of the burn rate of said solid propellant and for controlling operation of said control valve in response to said calculation of the integral of the burn rate of said solid propellant and in response to a signal representative of a time to target.

2. The solid divert and attitude control system of claim 1, wherein said solid propellant grain in said generator has a non-constant burn area.

3. The solid divert and attitude control system of claim 2, wherein said profile includes a first boost phase grain, an intermediate sustain phase grain, and a second boost phase grain.

4. The solid divert and attitude control system of claim 3, wherein said generator grain forming said first boost phase grain has a first area, said second boost phase grain has a second area and said grain forming said intermediate sustain phase has a third area which is less than each of said first and second areas.

5. The solid divert and attitude control system of claim 4, wherein said third area is one-half of each of said first and second areas.

6. The solid divert and attitude control system of claim 4, wherein said third area is less than one-half of each of said first and second areas.

7. The solid divert and attitude control system of claim 1, further comprising:
   means for sensing mean bulk temperature of the solid propellant in the gas generator;
   means for sensing the pressure being generated by the solid propellant gas generator; and
   said controller receiving signals from said temperature and pressure sensing means representing the sensed temperature and the sensed pressure.

8. The solid divert and attitude control system of claim 1, further comprising means for receiving a signal representative of a thrust level command to the controller.

9. The solid divert and attitude control system of claim 1, further comprising means for receiving a signal representative of a mode command to the controller.

10. The solid divert and attitude control system of claim 1, wherein said solid propellant is burned at a first level during a first boost phase, at a second level during a coast phase, and at a third level during a second boost phase, and said controller is used to control the pressure generated by said solid propellant generator during said coast phase to insure that said second boost phase begins at a particular point in time.

11. A method for controlling a vehicle comprising:
   providing a solid propellant gas generator having a solid propellant grain with a profile for generating different thrust levels and a control valve for modulating the effective exit area of the solid propellant gas generator;
   inputting information about time to target into a controller;
   calculating the integral of the burn rate of said solid propellant in said controller; and
   in response to said time to target information and said calculated burn rate integral, transmitting at least one signal from said controller to said control valve to operate said control valve during at least one portion of a flight of the vehicle.

12. A method according to claim 11, wherein said at least one signal is transmitted to said control valve during a sustain phase portion of said flight to insure proper initiation of a boost phase portion.

* * * * *